(12) United States Patent
Friesen et al.

(10) Patent No.: US 9,287,597 B2
(45) Date of Patent: Mar. 15, 2016

(54) IONIC LIQUID CONTAINING HYDROXAMATE AND N-ALKYL SULFAMATE IONS

(71) Applicant: FLUIDIC, INC., Scottsdale, AZ (US)

(72) Inventors: Cody A. Friesen, Fort McDowell, AZ (US); Derek Wolfe, Scottsdale, AZ (US); Paul Bryan Johnson, Phoenix, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 0 days.

(21) Appl. No.: 14/077,903

(22) Filed: Nov. 12, 2013

(65) Prior Publication Data

US 2015/0221999 A1    Aug. 6, 2015

Related U.S. Application Data

(60) Provisional application No. 61/726,134, filed on Nov. 14, 2012.

(51) Int. Cl.
*H01M 12/06* (2006.01)

(52) U.S. Cl.
CPC ...... *H01M 12/06* (2013.01); *H01M 2300/0025* (2013.01)

(58) Field of Classification Search
CPC .. H01M 12/06; H01M 12/08; H01M 2300/45
See application file for complete search history.

(56) References Cited

U.S. PATENT DOCUMENTS

| | | | |
|---|---|---|---|
| 5,827,602 A | 10/1998 | Koch et al. | |
| 7,605,297 B2 | 10/2009 | Maase et al. | |
| 7,863,458 B2 | 1/2011 | Wasserscheid et al. | |
| 7,960,061 B2 | 6/2011 | Jost et al. | |
| 2003/0065037 A1 | 4/2003 | Mattison et al. | |
| 2005/0194561 A1* | 9/2005 | Davis, Jr. | ......... 252/67 |
| 2006/0217584 A1 | 9/2006 | Nunez et al. | |
| 2009/0284229 A1 | 11/2009 | Friesen et al. | |
| 2010/0119895 A1 | 5/2010 | Friesen et al. | |
| 2010/0285375 A1* | 11/2010 | Friesen et al. | ......... 429/405 |
| 2010/0316935 A1 | 12/2010 | Friesen et al. | |
| 2011/0039181 A1 | 2/2011 | Friesen et al. | |
| 2011/0065018 A1 | 3/2011 | Kim et al. | |
| 2011/0070506 A1 | 3/2011 | Friesen et al. | |
| 2011/0086278 A1 | 4/2011 | Friesen et al. | |
| 2011/0189551 A1 | 8/2011 | Friesen et al. | |

(Continued)

FOREIGN PATENT DOCUMENTS

| | | |
|---|---|---|
| CN | 1946673 | 4/2007 |
| CN | 101137436 | 3/2008 |

(Continued)

OTHER PUBLICATIONS

Chinese Office Action dated Feb. 9, 2015 for Appln. No. 2012800247268.

(Continued)

*Primary Examiner* — Stewart Fraser

(74) *Attorney, Agent, or Firm* — Pillsbury Winthrop Shaw Pittman, LLP

(57) ABSTRACT

Embodiments of the invention are related to ionic liquids and more specifically to ionic liquids used in electrochemical metal-air cells in which the ionic liquid includes a cation and an anion selected from hydroxamate and/or N-alkyl sulfamate anions.

14 Claims, 1 Drawing Sheet

(56) References Cited

U.S. PATENT DOCUMENTS

| | | | |
|---|---|---|---|
| 2011/0200893 A1 | 8/2011 | Friesen et al. | |
| 2011/0281184 A1* | 11/2011 | Friesen et al. | 429/405 |
| 2011/0305959 A1* | 12/2011 | Friesen et al. | 429/405 |
| 2012/0009491 A1 | 1/2012 | Friesen et al. | |

FOREIGN PATENT DOCUMENTS

| | | |
|---|---|---|
| CN | 102050788 | 5/2011 |
| EP | 1182196 | 2/2002 |
| EP | 1 398 318 | 3/2004 |
| GB | 129 7955 | 11/1972 |
| JP | 11307121 | 11/1999 |
| JP | 2002373704 | 12/2002 |
| WO | 01/93363 A1 | 12/2001 |
| WO | 2008/043837 A1 | 4/2008 |

OTHER PUBLICATIONS

U.S. Office Action dated Dec. 2, 2014 for U.S. Appl. No. 13/526,342.

U.S. Notice of Allowance dated Apr. 15, 2015 for U.S. Appl. No. 13/526,342.

K. Scott, Section 2—Membrane Materials, Preparation and Characterisation, In Handbook of Industrial Membranes (Second Edition), edited by K. Scott, Elsevier Science, Amsterdam, 1998, pp. 187-269, ISBN 9781856172332, http://dx.doi.org/10.1016/B978-185617233-2/50005-2. (http://www.sciencedirect.com/science/article/pii/B9781856172332500052).

Webber, A., et al., "Advances in Lithium-Ion Batteries", pp. 185-232 (2002).

Zhao, et al., "Electrochemistry of Room Temperature Protic Ionic Liquids", J. Phys. Chem. B., vol. 112, pp. 6923-6936 (2008).

Blomgren, G. E., J. Power Sources, vols. 119-121, pp. 326-329 (2003).

Chinese Office Action dated Jun. 30, 2015 for Appln. No. 2012800400535.

Chinese Office Action dated Nov. 1, 2015 for Appln. No. 2012800247268.

Australian Office Action dated Oct. 21, 2015 for Appln. No. 2012271279.

U.S. Office Action dated Nov. 12, 2015 for U.S. Appl. No. 13/526,432.

Australian Office Action dated Nov. 16, 2015 for Appln. No. 2012271326.

* cited by examiner

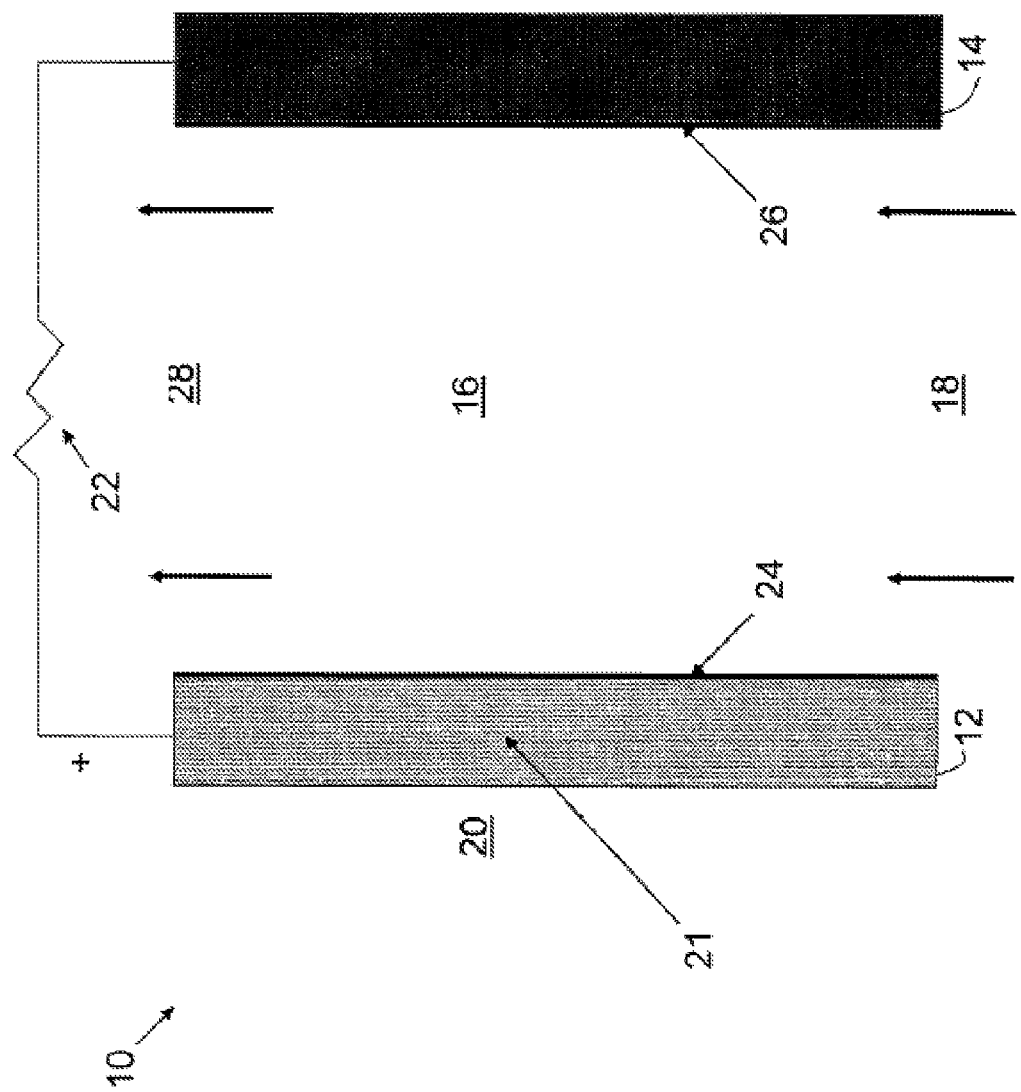

IONIC LIQUID CONTAINING HYDROXAMATE AND N-ALKYL SULFAMATE IONS

CROSS-REFERENCE TO RELATED APPLICATION

This application claims benefit to U.S. Provisional Application Ser. No. 61/726,134, filed Nov. 14, 2012, the entire contents of which is incorporated herein in its entirety.

GOVERNMENT FUNDING STATEMENT

This invention was made with U.S. government support under Contract No. DB-AR-00000038 awarded by the Department of Energy. The government has certain rights in the invention.

FIELD OF THE INVENTION

Embodiments of the invention are related to ionic liquids and more specifically to ionic liquids used in electrochemical metal-air cells in which the ionic liquid includes a cation and an anion selected from hydroxamate and N-alkyl sulfamate anions.

BACKGROUND

A significant detriment to the energy density of most batteries is posed by the battery's cathode. This is true for battery chemistries using, for example, lithium or nickel. Typically, oxidant is stored at the cathode at a molar charge capacity that is two to five times lower than that of the anode. Many fuel cells, on the other hand, use oxygen from the air as a source of oxidant. The existence of a continuous and virtually limitless oxidant source enables, in principle, high energy density. However, the use of hydrogen and organic fuels precludes high energy efficiencies due to problems with vapor pressure and balance-of-systems complexity, such as humidification and membrane issues. Metal-air electrochemical cells are able to combine the ultra-high anode capacity of batteries with the air-breathing cathode of fuel cells in order to achieve substantial energy densities that are relevant to modern energy demands.

Metal-air batteries typically include a fuel electrode at which metal fuel is oxidized, an air electrode at which oxygen is reduced, and an electrolyte for providing ion conductivity. A limiting factor with conventional metal-air batteries is the evaporation of the electrolyte solution (i.e., the ionically conductive medium), particularly the evaporation of the solvent, such as water in an aqueous electrolyte solution. Because the air electrode is required to be air permeable to absorb oxygen, it also may permit the solvent vapor, such as water vapor, to escape from the cell. Over time, the cell becomes incapable of operating effectively because of the depletion of the solvent. Indeed, in many cell designs this evaporation issue renders the cell inoperable before the fuel is consumed. The evaporation issue is exacerbated in secondary (i.e., rechargeable) cells, because the fuel may be re-charged repeatedly over the life of the cell, whereas the electrolyte solution cannot (absent replenishment from an external source).

There are other problems associated with conventional aqueous electrolyte batteries, such as water electrolysis during recharging, and self discharge. During recharge, a current is passed through the battery to reduce the oxidized fuel at the fuel electrode. Some of the current, however, electrolyzes the water resulting in hydrogen evolution (reduction) at the fuel electrode and oxygen evolution (oxidation) at the oxygen electrode as represented in the following equations:

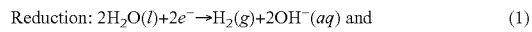

Reduction: $2H_2O(l)+2e^- \rightarrow H_2(g)+2OH^-(aq)$ and (1)

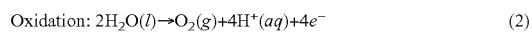

Oxidation: $2H_2O(l) \rightarrow O_2(g)+4H^+(aq)+4e^-$ (2)

In this manner, further aqueous electrolyte is lost from the battery. Additionally, the electrons that are consumed in reducing hydrogen are not available to reduce the fuel oxide. Therefore, the parasitic electrolysis of the aqueous electrolyte reduces the round trip efficiency of the secondary battery.

Self-discharge may result from impurities in the electrodes or reaction with the electrolyte. Typically, self-discharge from impurities in the electrodes is small (2-3% loss per month). The reaction of an active metal with water and/or $O_2$ dissolved in the water, however, may be quite high (20-30% per month).

To compensate for these problems, metal-air batteries with aqueous electrolyte solutions are typically designed to contain a relatively high volume of electrolyte solution. Some cell designs even incorporate means for replenishing the electrolyte from an adjacent reservoir to maintain the electrolyte level. However, either approach adds to both the overall size of the cell, as well as the weight of the cell, without enhancing the cell performance (except to ensure that there is a significant volume of electrolyte solution to offset evaporation of the water or other solvent over time). Specifically, the cell performance is generally determined by the fuel characteristics, the electrode characteristics, the electrolyte characteristics, and the amount of electrode surface area available for reactions to take place. But the volume of electrolyte solution in the cell generally does not have a significant beneficial effect on cell performance, and thus generally only detracts from cell performance in terms of volumetric and weight based ratios (power to volume or weight, and energy to volume or weight). Also, an excessive volume of electrolyte may create a higher amount of spacing between the electrodes, which may increase ohmic resistance and detract from performance.

The use of non-aqueous systems for electrochemical cells has been suggested (see e.g., U.S. Pat. No. 5,827,602). In non-aqueous systems, the aqueous electrolyte may be replaced with an ionic liquid. Ionic liquids which contain a strong Lewis acid such as $AlCl_3$, however, are known to liberate toxic gases when exposed to moisture.

The use of low or room temperature ionic liquid rather than an aqueous electrolyte in a metal-air electrochemical cell, are described in U.S. Provisional Application Ser. Nos. 61/383,510, filed Sep. 16, 2010; 61/355,081, filed Jun. 15, 2010; 61/334,047, filed May 12, 2010; 61/329,278, filed Apr. 29, 2010; 61/177,072, filed May 11, 2009, and 61/267,240, filed Dec. 7, 2009, and described in U.S. patent application Ser. No. 13/105,794, filed on May 11, 2011; Ser. No. 13/096,851, filed Apr. 28, 2011; Ser. No. 13/085,714, filed Apr. 13, 2011; and Ser. No. 12/776,962, filed May 10, 2010, the disclosures of each of which are incorporated herein by reference in their entirety. The use of a low or room temperature ionic liquid in the cell essentially eliminates the problems associated with evaporation of solvent from an electrolytic solution.

Blomgren et al. describe the use of ionic liquids as electrolyte materials in the lithium-ion battery (A. Webber, G. E. Blomgren, Advances in Lithium-Ion Batteries (2002), 185-232; G. E. Blomgren, J. Power Sources 2003, 119-121, 326-329). Covalent Associates in WO 01/93363 describe a non-flammable electrolyte consisting of a salt having an organic cation or of an ionic liquid, an organic solvent, an acrylate polymer or fluoropolymer, and a conducting salt. Yuasa Corporation in JP 2002373704 describes a non-aqueous electrolyte consisting of 1-ethyl-3-methylimidazolium, a lithium salt and a cyclic ester having a .pi. bond. Mitsubishi Chemicals Industries Ltd. in JP 11307121 describes an electrolyte consisting of an ionic liquid based on quaternary imidazolium or pyridinium ions and from 1% to 130% by volume of an organic cyclic compound. Jost, et al., U.S. Pat. No. 7,960,061 discloses ionic liquids for use as an electrolyte material, the disclosure of which is incorporated herein by reference in its entirety.

Other disclosures of ionic liquids useful as solvents or useful in extracting various unwanted chemical entities include Maase, et al., U.S. Pat. No. 7,605,297, Wasserscheid, et al., U.S. Pat. No. 7,863,458, Nunez, et al., U.S. Patent Application Publication No. 2006/0217,584, and D'Andola, et al., WO 2008/043837, the disclosures of each of which is incorporated herein by reference in their entireties. Zhao, et al., "Electrochemistry of Room Temperature Protic Ionic Liquids," J. Phys. Chem. B, Vol. 112, pp. 6923-6936 (2008), discloses protic ionic liquids for potential use in fuel cells, in which the ionic liquids contain various anions derived from acids such as acetic acid, formic acid, hydrochloric acid, sulfamic acid, and the like.

Room temperature ionic liquids have extremely low vapor pressures (some have vapor pressures that are essentially immeasurable under standard conditions) and thus experience little or no evaporation. Therefore, cells using low or room temperature ionic liquids as their ionically conductive media need not incorporate excessive volumes of solution in order to compensate for evaporation over time. Relatively small amounts of ionic liquid are sufficient to support the electrochemical reactions needed for cell operation, thereby reducing cell weight and volume and increasing power to volume/weight ratios. Also, other problems associated with solvents, such as hydrogen evolution in an aqueous solution, may be avoided. This inventive development is not conceded to be prior art and merely is described for contextual purposes to facilitate an understanding of the further development described herein.

SUMMARY OF THE INVENTION

An embodiment of the invention relates to an ionic liquid comprising a cation and an anion selected from hydroxamate and N-alkyl sulfamate anions. An additional embodiment of the invention relates to a metal-air cell comprising a fuel electrode for oxidizing a fuel, an air electrode configured to absorb and reduce gaseous oxygen, and an ionic liquid comprising a cation and an anion selected from hydroxamate and N-alkyl sulfamate anions. Another embodiment of the invention relates to the ionically conductive medium per se for use in an electrochemical cell.

Other objects, aspects, and advantages of the present invention will become apparent from the following detailed description, the accompanying drawings, and the appended claim.

BRIEF DESCRIPTION OF THE DRAWINGS

The invention may best be understood by referring to the following description and accompanying drawings that are used to illustrate embodiments of the invention.

FIG. 1 is a schematic diagram of an electrochemical cell according to an embodiment of the invention.

DETAILED DESCRIPTION

For the purposes of this application, a low temperature ionic liquid is defined as an ionic liquid having a melting point at or below 150° C. at 1 atm. These low temperature ionic liquids may also include the species known as room temperature ionic liquids, which are defined as ionic liquids having a melting point at or below 100° C. at 1 atm. Ionic liquids are also referred to as liquid salts. By definition, an ionic liquid is composed primarily of anions and cations of the salt. While an ionic liquid itself may be a solvent with respect to one or more other soluble products present in the ionic liquid, such as an additive or reactant by-product created by operation of the cell, an ionic liquid does not require the use of a solvent to dissolve the salt, as the liquid itself is "self-dissolving," i.e., it is a liquid of the electrolyte salt anions and cations by its own nature, and the use of a separate solvent to dissolve the salt is not needed.

However, even though low temperature or room temperature ionic liquids are defined by their respective melting points at 1 atm., in some embodiments the cell may be operated in an environment with a different pressure, and thus the melting point may vary with the operating pressure. Thus, reference to a melting point at 1 atm. is used as a reference point to define these liquids, and does not imply or restrict its actual use conditions in operation.

In some non-limiting embodiments, a substance that may be regarded in some contexts as a solvent may be added in relatively small amounts to the ionic liquid, either for enhancing the solubility of solutes in the ionic liquid, such as an additive added to or a by-product created in the ionic liquid by operation of the cell, or for providing a non-solvent functionality, such as the promotion of certain electrochemical reactions or transport of ions. Thus, the use of an ionic liquid does not entirely exclude the presence of a substance that may be regarded as solvent in other contexts, or act as a solvent with respect to solutes in the ionic liquid, but because a solvent is not needed to dissolve an ionic liquid, it can be used in a substantially smaller amount compared to conventional electrolyte salts requiring a bulk solvent for dissolution of the salt per se, such as aqueous electrolyte solutions. Indeed, in some non-limiting embodiments it is possible that no additive solvent is used.

In some non-limiting embodiments, the ionically conductive medium between the fuel and air electrodes may be a pure low temperature ionic liquid, i.e., it consists of the ionic liquid. In other non-limiting embodiments, it may consist essentially of the ionic liquid, meaning for the purposes of this application that it may include the ionic liquid and one or more other substances that do not materially affect its characteristic of being an ionic liquid. Thus, the term "consisting essentially of" an ionic liquid expressly encompasses the addition of one or more additives to enhance the ionic transport functionality of the ionic liquid, support the electrochemical reactions of the cell and/or enhance the solubility of solutes in the ionic liquid, but excludes the use of a bulk solvent required to dissolve the salt, such as is the case with aqueous electrolyte solutions. Of course, any presence of reaction by-products or ions in the ionic liquid would be permitted in either the embodiments consisting of the ionic liquid or the embodiments consisting essentially of the ionic liquid, as the very nature of the ionic liquid is to promote the transport and/or formation of such ions and/or by-products. The terms "solvent free" or "devoid of solvent" may be used to characterize the ionic liquid, and this terminology should be understood as (a) only excluding a bulk solvent that is provided for purposes of dissolving the ionic liquid, and not excluding the ionic liquid itself, which may act as a solvent with respect to another substance (e.g., an additive or the cell reaction by-products); and (b) not excluding the presence of one or more additives to enhance the ionic transport functionality of the ionic liquid, support the electrochemical reactions of the cell and/or enhance the solubility of solutes in the ionic liquid, even if such an additive theoretically could be regarded as a solvent in other contexts or with respect to solutes in the ionic liquid, but is not functioning for purposes of dissolution of the ionic liquid (for example, in some embodiments, water in the 10-100 ppm range may be used to promote the electrochemical reactions by increasing proton availability for supporting the oxygen reduction reaction, but the water is not functioning as a solvent with respect to the ionic liquid, although it may function as a solvent in other types of electrolytes, namely aqueous electrolytes).

Ionic liquids generally refer to salts that form stable liquids comprising ions. That is, ionic liquids are fully dissociated, consisting essentially of negative and positive ions. Thus, ionic liquids inherently conduct electricity. Further, ionic liquids have negligible vapor pressure, low viscosity, wide liquids (up to 400° C.), high thermal stability, and a large electrochemical window (>5V). Because of these properties, ionic liquids typically will not evaporate or be consumed during the charge/discharge cycle of an electrochemical cell.

Ionic liquids generally exist in two forms: protic and aprotic. Protic ionic liquids have available protons which may be oxidized or reduced or may coordinate with negative ions, such as reduced oxygens. Some examples of protic ILs are synthesized from combinations of anions tetrachloroaluminate, bis(trifluoromethylsulfonyl)imide, methylsulfonate, nitrate, and acetate, and cations triethylammonium, diethylmethylammonium, dimethylethylammonium, dimethylethylammonium triflate, ethylammonium, α-picolinium, pyridinium, and 1,8-bis(dimethylamino)naphthalene, 2,6-di-tert-butylpyridine, and derivatives of the guanadines. Aprotic ionic liquids, however, generally do not have proton activity. Some example of aprotic room temperature ionic liquids are synthesized from combinations of anions selected from chloride (Cl$^-$), hexafluorophosphate (PF$_6^-$), iodide, tetrfluorborate, bis(trifluoromethylsulfonyl)imide (C$_2$F$_6$NO$_4$S$_2^-$) (TFSI), trifluoromethanesulfonate (CF$_3$O$_3$S$^-$), and cations selected from imidazolium, sulfonium, pyrrolidinium, quaternized ammonium or phosponium and their derivatives. Despite a lack of proton activity, an aprotic ionic liquid can comprise a proton. For example, an aprotic ionic liquid can comprise at least one cation that has at least one strongly bound proton thereto. Many other options of ionic liquids exist, and these lists of examples are not intended to be limiting in any way.

Embodiments of the invention include ionic liquids comprising a cation and an anion selected from hydroxamate and N-alkyl sulfamate anions. Any cation can be used in the embodiments, so long as it forms a suitable ionic liquid with a hydroxamate or N-alkyl suflamate anion. Suitable cations can be selected from one or more of the following:

Phosphonium cations of the general formula:

Quaternary ammonium cations of the general formula:

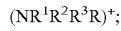

Imidazolium cations of the general formula:

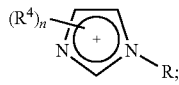

Pyrazolium cations of the general formula:

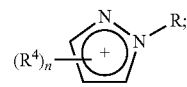

Thiazolium cations of the general formula:

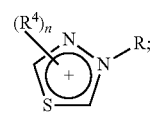

Pyridinium cations of the general formula:

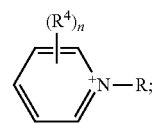

Triazolium cations of the general formula:

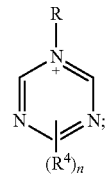

Quinolinium cations of the general formula:

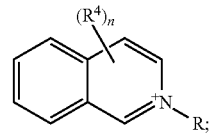

Morpholinium cations of the general formula:

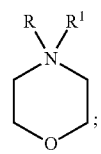

or

Diazabicyclo[2.2.2]octanium cations of the general formula:

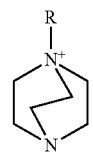

where R$^1$, R$^2$, and R$^3$, are independently selected at each occurrence from the group consisting of hydrogen; linear or branched, saturated or unsaturated, aliphatic or alicyclic alkyl groups having from 1 to 30 carbon atoms; oligoethylene glycol monoalkyl ethers of the form (R'—(O—CH$_2$—CH$_2$)$_p$—O—CH$_2$—CH$_2$), wherein p represents a number of from 1 to 30, preferably from 5 to 20, more preferably from 10 to 15, and R' represents a linear or branched, saturated or unsaturated, aliphatic or alicyclic alkyl group having 1 to 30, preferably 5 to 15, more preferably 8 to 12, carbon atoms; alkenyl; cycloalkyl; heteroaryl, heteroaryl-C$_{1-6}$-alkyl groups having from 3 to 8 carbon atoms in the heteroaryl residue and at least one heteroatom selected from N, O, P, and S which may be substituted with at least one group selected from alkyl groups and/or halogen atoms; aryl, aryl-C$_{1-6}$-alkyl groups having from 5 to 12 carbon atoms in the aryl residue which may be optionally substituted with at least one C$_{1-6}$ alkyl group and/or halogen atom;

where R is selected from linear or branched, saturated or unsaturated, aliphatic or alicyclic alkyl groups having 1 to 30, preferably 5 to 15, more preferably 8 to 12, carbon atoms; oligoethylene glycol monoalkyl ethers of the form (R'—(O—CH$_2$—CH$_2$)$_p$—O—CH$_2$—CH$_2$), wherein p represents a number of from 1 to 30, preferably from 5 to 20, more preferably from 10 to 15, and R' represents a linear or branched, saturated or unsaturated, aliphatic or alicyclic alkyl group having 1 to 30, preferably 5 to 15, more preferably 8 to 12, carbon atoms; alkenyl; cycloalkyl; heteroaryl-C$_{1-6}$-alkyl groups having from 3 to 8 carbon atoms in the aryl residue and at least one heteroatom selected from N, O, P, and S which may be substituted with at least one C$_{1-6}$ alkyl group and/or halogen atoms; aryl-C$_{1-6}$-alkyl groups having from 5 to 12 carbon atoms in the aryl residue which may be optionally substituted with at least one C$_{1-6}$ alkyl group and/or halogen atom;

where n is 0, 1, 2, 3, or 4; and where R$^4$ is selected from C$_{1-6}$-alkyl, halogen, amino, cyan, C$_{1-4}$-alkoxy, carboxylate, or sulfonate.

Preferred cations are ammonium salts, or 1,3-substituted imidazolium salts, with particular preference to imidazolium salts that include one or more selected from the group consisting of 1,3-dimethylimidazolium, 1-ethyl-3-methylimidazolium, 1-methyl-3-propylimidazolium, 1-isopropyl-3-methylimidazolium, 1-butyl-3-methylimidazolium, 1-methyl-3-pentyl-imidazolium, 1-hexyl-3-methylimidazolium, 1-heptyl-3-methylimidazolium, 1-methyl-3-octylimidazolium, 1-decyl-3-methylimidazolium, 1-methyl-3-benzylimidazolium, 1-methyl-3-(3-phenylpropyl)imidazolium, 1-(2-ethyl)hexyl-3-methylimidazolium, 1-methyl-3-nonylimidazolium, 1-methyl-3-decylimidazolium, 1,2,3-trimethylimidazolium, 1-ethyl-2,3-dimethylimidazolium, 1-butyl-2,3-dimethylimidazolium, N-ethyl-N-methylmorpholinium, 1-methylimidazo[1,2-a]pyridinium. A particularly preferred cation is 1-methyl-1,4-diazabicyclo[2.2.2]octanium The ionic liquid comprises one or more cations as described herein, together with an anion selected from hydroxamate and N-alkyl sulfamate anions. Suitable hydroxamate anions include those having the following general formula:

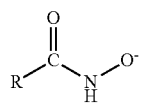

where R is selected from hydrogen, linear or branched, saturated or unsaturated, aliphatic or alicyclic alkyl groups having 1 to 30, preferably 5 to 15, more preferably 8 to 12, carbon atoms; oligoethylene glycol monoalkyl ethers of the form (R'—(O—CH$_2$—CH$_2$)$_p$—O—CH$_2$—CH$_2$), wherein p represents a number of from 1 to 30, preferably from 5 to 20, more preferably from 10 to 15, and R' represents a linear or branched, saturated or unsaturated, aliphatic or alicyclic alkyl group having 1 to 30, preferably 5 to 15, more preferably 8 to 12, carbon atoms; alkenyl; cycloalkyl; heteroaryl-C$_{1-6}$-alkyl groups having from 3 to 8 carbon atoms in the aryl residue and at least one heteroatom selected from N, O, P, and S which may be substituted with at least one C$_{1-6}$ alkyl group and/or halogen atoms; aryl-C$_{1-6}$-alkyl groups having from 5 to 12 carbon atoms in the aryl residue which may be optionally substituted with at least one C$_{1-6}$ alkyl group and/or halogen atom.

Particularly preferred hydoxamate anions include acetohydroxyamate and benzohydroxamate. The anion also may be an N-alkyl sulfamate anion having the following general formula:

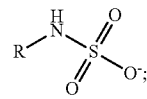

where R is selected from linear or branched, saturated or unsaturated, aliphatic or alicyclic alkyl groups having 1 to 30, preferably 5 to 15, more preferably 8 to 12, carbon atoms; oligoethylene glycol monoalkyl ethers of the form (R'—(O—CH$_2$—CH$_2$)$_p$—O—CH$_2$—CH$_2$), wherein p represents a number of from 1 to 30, preferably from 5 to 20, more preferably from 10 to 15, and R' represents a linear or branched, saturated or unsaturated, aliphatic or alicyclic alkyl group having 1 to 30, preferably 5 to 15, more preferably 8 to 12, carbon atoms; alkenyl; cycloalkyl; heteroaryl-C$_{1-6}$-alkyl groups having from 3 to 8 carbon atoms in the aryl residue and at least one heteroatom selected from N, O, P, and S which may be substituted with at least one C$_{1-6}$ alkyl group and/or halogen atoms; aryl-C$_{1-6}$-alkyl groups having from 5 to 12 carbon atoms in the aryl residue which may be optionally substituted with at least one C$_{1-6}$ alkyl group and/or halogen atom.

A particularly preferred N-alkyl sulfamate anion is N-(2-pyridylmethyl) sulfamate. Particularly preferred ionic liquids may comprise one or more of the following cation-anion pairs: N-ethyl-N-methylmorpholinium N-(2-pyridylmethyl) sulfamate; 1-methyl-1,4-diazabicyclo[2.2.2]octanium acetohydroxamate; 1-methyl-1,4-diazabicyclo[2.2.2]octanium benzohydroxamate, and mixtures thereof.

In the context of the present invention, the expression "alkyl" includes linear or branched, saturated or unsaturated, aliphatic or alicyclic alkyl groups having 1 to 30, preferably 5 to 15, more preferably 8 to 12, carbon atoms. Examples of alkyl groups are, in particular, methyl, ethyl, n-propyl, isopropyl, n-butyl, isobutyl, sec-butyl, tert-butyl, n-pentyl, n-hexyl, n-heptyl, n-octyl, n-nonyl, n-decyl, n-undecyl, n-dodecyl, n-tridecyl, n-tetradecyl, n-hexadecyl, n-octadecyl and n-eicosyl.

The expression alkyl also includes alkyl radicals in which the carbon chains can be interrupted by one or more non-adjacent groups which are chosen from —O—, —CO— and/or —SO$_2$—. R$^e$ preferably represents hydrogen, alkyl, cycloalkyl, hetero-cycloalkyl, aryl or hetaryl.

Examples of alkyl radicals in which the carbon chains can be interrupted by one or more non-adjacent groups are the following: 2-methoxyethyl, 2-ethoxyethyl, 2-propoxyethyl, 2-butoxyethyl, 3-methoxypropyl, 3-ethoxypropyl, 3-propoxypropyl, 3-butoxypropyl, 4-methoxybutyl, 4-ethoxybutyl, 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl, 3,6,9trioxaundecyl, 3,6,9-trioxadodecyl, 3,6,9,12-tetraoxamidecyl and 3,6,9,12-tetraoxatetradecyl; 2-methylthioethyl, 2-ethylthioethyl, 2-propylthioethyl, 2-butylthioethyl, 3-methylthiopropyl, 3-ethylthiopropyl, 3-propylthiopropyl, 3-butylthiopropyl, 4-methylthiobutyl, 4-ethylthiobutyl, 4-propylthiobutyl, 3,6-dithiaheptyl, 3,6-dithiaoctyl, 4,8-dithianonyl, 3,7-dithiaoctyl, 3,7-dithianonyl, 2- and 4-butylthiobutyl, 4,8-dithiadecyl, 3,6,9-trithiadecyl, 3,6,9-trithiaundecyl, 3,6,9-trithiadodecyl, 3,6,9,12-tetrathiamidecyl and 3,6,9,12-tetrathiatetradecyl; 2-monomethyl- and 2-monoethylaminoethyl, 2-dimethylaminoethyl, 2- and 3-dimethylaminopropyl, 3-monoisopropylaminopropyl, 2- and 4-monopropylaminobutyl, 2- and 4-dimethylaminobutyl, 6-methyl-3,6-diazaheptyl, 3,6-dimethyl-3,6-diazaheptyl, 3,6-diazaoctyl, 3,6-dimethyl-3,6-diazaoctyl, 9-methyl-3,6,9-triazadecyl, 3,6,9-trimethyl-3,6,9-triazadecyl, 3,6,9-triazaundecyl, 3,6,9-trimethyl-3,6,9-triazaundecyl, 12-methyl-3,6,9,12-tetraazamidecyl and 3,6,9,12-tetramethyl-3,6,9,12-tetraazamidecyl.

Examples of alkyl radicals in which the carbon chains can be interrupted by several non-adjacent groups are also polyoxyalkylenes, i.e. compounds with recurring units, which are preferably chosen from $(CH_2CH_2O)_{x1}$, $(CH(CH_3)CH_2O)_{x2}$ and $((CH_2)_4O)_{x3}$, wherein x1, x2 and x3 independently of one another represent an integer from 2 to 100, preferably 3 to 80. The sum of x1, x2 and x3 represents an integer from 2 to 300, preferably 3 to 100. In polyoxyalkylenes which contain two or three different recurring units, the sequence is as desired, i.e. they can be statistically distributed, alternating or blocklike recurring units. The above statements for the polyoxyalkylenes apply analogously to polyalkyleneimines, wherein the oxygen atom is in each case replaced by an $NR^e$ group, wherein $R^e$ preferably represents hydrogen or $C_{1-4}$-alkyl.

The expression alkyl also includes substituted alkyl radicals. Substituted alkyl groups can contain one or more (e.g. 1, 2, 3, 4, 5 or more than 5) substituents, depending on the length of the alkyl chain. These are preferably chosen independently of one another from cycloalkyl, heterocycloalkyl, aryl, hetaryl, halogen, hydroxyl, SH, COOH, carboxylate, $SO_3H$, sulfonate, $NR^1R^2$, nitro and cyano, wherein $R^1$ and $R^2$ independently of one another represent hydrogen, alkyl, cycloalkyl, heterocycloalkyl, aryl or hetaryl. Carboxylate and sulfonate represent a derivative of a carboxylic acid function or of a sulfonic acid function, in particular a metal carboxylate or sulfonate, a carboxylic acid ester or sulfonic acid ester or a carboxylic acid amide or sulfonic acid amide. Cycloalkyl, heterocycloalkyl, aryl and hetaryl substituents of the alkyl groups can in their turn be unsubstituted or substituted; suitable substituents are those mentioned below for these groups.

The above statements relating to alkyl also apply to the alkyl moieties in alkoxy, alkylamino, alkylthio (alkylsulfanyl), alkylsulfinyl, alkylsulfonyl, etc. Suitable substituted alkyl radicals are the following: carboxymethyl, 2-carboxyethyl, 3-carboxypropyl, 4-carboxybutyl, 5-carboxypentyl, 6-carboxyhexyl, 8-carboxyoctyl, 10-carboxydecyl, 12-carboxydodecyl and 14-carboxytetradecyl; sulfomethyl, 2-sulfoethyl, 3-sulfopropyl, 4-sulfobutyl, 5-sulfopentyl, 6-sulfohexyl, 8-sulfooctyl, 10-sulfodecyl, 12-sulfododecyl and 14-sulfotetradecyl; 2-hydroxyethyl, 2- and 3-hydroxypropyl, 3- and 4-hydroxybutyl and 8-hydroxy-4-oxaoctyl; 2-cyanoethyl, 3-cyanopropyl, 3- and 4-cyanobutyl; 2-chloroethyl, 2- and 3-chloropropyl, 2-, 3- and 4-chlorobutyl, 2-bromoethyl, 2- and 3-bromopropyl and 2-, 3- and 4-bromobutyl; 2-nitroethyl, 2- and 3-nitropropyl and 2-, 3- and 4-nitrobutyl.

Examples of alkoxy include: methoxy, ethoxy, propoxy, butoxy, pentoxy and hexoxy. Examples of alkylthio include methylthio, ethylthio, propylthio, butylthio, pentylthio and hexylthio.

Alkyl radicals substituted by aryl ("arylalkyl") contain at least one, as defined below, unsubstituted or substituted aryl group. In this context, the alkyl group in "arylalkyl" can carry at least one further substituent and/or be interrupted by one or more non-adjacent groups which are chosen from —O—, —$NR^e$—, —CO— and/or —$SO_2$—. $R^e$ preferably represents hydrogen, alkyl, cycloalkyl, heterocycloalkyl, aryl or hetaryl. Arylalkyl preferably represents phenyl-$C_{1-10}$-alkyl, particularly preferably phenyl-$C_{1-4}$-alkyl, e.g. benzyl, 1-phenylethyl, 2-phenylethyl, 1-phenylprop-1-yl, 2-phenylprop-1-yl, 3-phenylprop-1-yl, 1-phenylbut-1-yl, 2-phenylbut-1-yl, 3-phenylbut-1-yl, 4-phenylbut-1-yl, 1-phenylbut-2-yl, 2-phenylbut-2-yl, 3-phenylbut-2-yl, 4-phenylbut-2-yl, 1-(benzyl)-eth-1-yl, 1-(benzyl)-1-(methyl)-eth-1-yl or 1-(benzyl)-1-(methyl)-prop-1-yl; preferably benzyl and 2-phenylethyl.

In the context of the present invention, the expression "alkenyl" denotes straight-chain and branched alkenyl groups, which can carry one or more double bonds (e.g. 1, 2, 3, 4 or more than 4), depending on the chain length. Preferred groups are $C_{2-18}$-, particularly preferably $C_{2-12}$-alkenyl groups. The expression "alkenyl" also includes substituted alkenyl groups, which can carry one or more (e.g. 1, 2, 3, 4, 5 or more than 5) substituents. Suitable substituents are chosen e.g. from cycloalkyl, heterocycloalkyl, aryl, hetaryl, halogen, hydroxyl, SH, COOH, carboxylate, $SO_3H$, sulfonate, alkoxy, alkylthio, alkylsulfinyl, alkylsulfonyl, $NE^3E^4$, nitro and cyano, wherein $E^3$ and $E^4$ independently of one another represent hydrogen, alkyl, cycloalkyl, heterocycloalkyl, aryl or hetaryl.

Particularly preferred alkenyl groups include, for example, ethenyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, penta-1,3-dien-1-yl, hexa-1,4-dien-1-yl, hexa-1,4-dien-3-yl, hexa-1,4-dien-6-yl, hexa-1,5-dien-1-yl, hexa-1,5-dien-3-yl, hexa-1,5-dien-4-yl, hepta-1,4-dien-1-yl, hepta-1,4-dien-3-yl, hepta-1,4-dien-6-yl, hepta-1,4-dien-7-yl, hepta-1,5-dien-1-yl, hepta-1,5-dien-3-yl, hepta-1,5-dien-4-yl, hepta-1,5-dien-7-yl, hepta-1,6-dien-1-yl, hepta-1,6-dien-3-yl, hepta-1,6-dien-4-yl, hepta-1,6-dien-5-yl, hepta-1,6-dien-2-yl, octa-1,4-dien-1-yl, octa-1,4-dien-2-yl, octa-1,4-dien-3-yl, octa-1,4-dien-6-yl, octa-1,4-dien-7-yl, octa-1,5-dien-1-yl, octa-1,5-dien-3-yl, octa-1,6-dien-1-yl, octa-1,6-dien-3-yl, octa-1,6-dien-4-yl, octa-1,6-dien-5-yl, octa-1,6-dien-2-yl, deca-1,4-dienyl, deca-1,5-dienyl, deca-1,6-dienyl, deca-1,7-dienyl, deca-1,8-dienyl, deca-2,5-dienyl, deca-2,6-dienyl, deca-2,7-dienyl, deca-2,8-dienyl and the like. The statements relating to alkenyl also apply to the alkenyl groups in alkenyloxy, alkenylthio, etc.

In the context of the present invention, the expression "cycloalkyl" includes unsubstituted and also substituted cycloalkyl groups, preferably $C_{3-8}$-cycloalkyl groups, such as cyclopropyl, cyclobutyl, cyclopentyl, cyclohexyl, cycloheptyl or cyclooctyl, in particular $C_{5-8}$-cycloalkyl. Substituted cycloalkyl groups can contain one or more (e.g. 1, 2, 3, 4, 5 or more than 5) substituents. These are preferably chosen independently of one another from alkyl and the substituents mentioned above for the alkyl groups. In the case of substitution, the cycloalkyl groups preferably carry one or more, for example one, two, three, four or five, $C_{1-6}$-alkyl groups. Examples of preferred cycloalkyl groups are cyclopentyl, 2- and 3-methylcyclopentyl, 2- and 3-ethylcyclopentyl, cyclohexyl, 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, cycloheptyl, 2-, 3- and 4-methylcycloheptyl, 2-, 3- and 4-ethylcycloheptyl, 3- and 4-propylcycloheptyl, 3- and 4-isopropylcycloheptyl, 3- and 4-butylcycloheptyl, 3- and 4-sec-butylcycloheptyl, 3- and 4-tert-butylcycloheptyl, cyclooctyl, 2-, 3-, 4- and 5-methylcyclooctyl, 2-, 3-, 4- and 5-ethylcyclooctyl and 3-, 4- and 5-propylcyclooctyl.

Cycloalkyl also may denote cycloalkenyl, in which the expression "cycloalkenyl" denotes unsubstituted and substituted monounsaturated hydrocarbon groups having 3 to 8, preferably 5 to 6 carbon ring members, such as cyclopenten-1-yl, cyclopenten-3-yl, cyclohexen-1-yl, cyclohexen-3-yl, cyclohexen-4-yl and the like. Suitable substituents are those mentioned above for cycloalkyl.

In the context of the present invention, the expression "aryl" denotes mono- or polynuclear aromatic hydrocarbon radicals, which can be unsubstituted or substituted. Aryl preferably represents unsubstituted or substituted phenyl, naphthyl, fluorenyl, anthracenyl, phenanthrenyl, naphthacenyl, chrysenyl, pyrenyl, etc., and particularly preferably phenyl or naphthyl. Substituted aryls can contain one or more (e.g. 1, 2, 3, 4, 5 or more than 5) substituents, depending on the number and size of their ring systems. These are preferably chosen independently of one another from alkyl, alkoxy, cycloalkyl, heterocycloalkyl, aryl, hetaryl, halogen, hydroxyl, SH, alkylthio, alkylsulfinyl, alkylsulfonyl, COOH, carboxylate, $SO_3H$, sulfonate, $NE^5E^6$, nitro and cyano, wherein $E^5$ and $E^6$ independently of one another represent hydrogen, alkyl, cycloalkyl, heterocycloalkyl, aryl or hetaryl. Aryl particularly preferably represents phenyl, which in the case of substitution in general can carry 1, 2, 3, 4 or 5, preferably 1, 2 or 3 substituents.

Aryl, which carries one or more radicals, represents, for example, 2-, 3- and 4-methylphenyl, 2,4-, 2,5-, 3,5- and 2,6-dimethylphenyl, 2,4,6-trimethylphenyl, 2-, 3- and 4-ethylphenyl, 2,4-, 2,5-, 3,5- and 2,6-diethylphenyl, 2,4,6-triethylphenyl, 2-, 3- and 4-propylphenyl, 2,4-, 2,5-, 3,5- and 2,6-dipropylphenyl, 2,4,6-tripropylphenyl, 2-, 3- and 4-isopropylphenyl, 2,4-, 2,5-, 3,5- and 2,6-diisopropylphenyl, 2,4,6-triisopropylphenyl, 2-, 3- and 4-butylphenyl, 2,4-, 2,5-, 3,5- and 2,6-dibutylphenyl, 2,4,6-tributylphenyl, 2-, 3- and 4-isobutylphenyl, 2,4-, 2,5-, 3,5- and 2,6-diisobutylphenyl, 2,4,6-triisobutylphenyl, 2-, 3- and 4-sec-butylphenyl, 2,4-, 2,5-, 3,5- and 2,6-di-sec-butylphenyl, 2,4,6-tri-sec-butylphenyl, 2-, 3- and 4-tert-butylphenyl, 2,4-, 2,5-, 3,5- and 2,6-di-tert-butylphenyl and 2,4,6-tri-tert-butylphenyl; 2-, 3- and 4-methoxyphenyl, 2,4-, 2,5-, 3,5- and 2,6-dimethoxyphenyl, 2,4,6-trimethoxyphenyl, 2-, 3- and 4-ethoxyphenyl, 2,4-, 2,5-, 3,5- and 2,6-diethoxyphenyl, 2,4,6-triethoxyphenyl, 2-, 3- and 4-propoxyphenyl, 2,4-, 2,5-, 3,5- and 2,6-dipropoxyphenyl, 2-, 3- and 4-isopropoxyphenyl, 2,4-, 2,5-, 3,5- and 2,6-diisopropoxyphenyl and 2-, 3- and 4-butoxyphenyl; 2-, 3- and 4-cyanophenyl. A further example for substituted aryl, wherein two substituents bound to adjacent carbon atoms of the aryl ring may form together with said carbon atoms a fused ring is indenyl.

In the context of the present invention, the expression "heteroaryl" includes unsubstituted or substituted, heteroaromatic, mono- or polynuclear groups containing, for example, one, two, three or four heteroatoms from the group consisting of O, N, —$NR^e$— or S as ring atoms, preferably the groups pyridyl, quinolinyl, acridinyl, pyridazinyl, pyrimidinyl, pyrazinyl, pyrrolyl, imidazolyl, pyrazolyl, indolyl, purinyl, indazolyl, benzotriazolyl, 1,2,3-triazolyl, 1,3,4-triazolyl and carbazolyl, where these heterocycloaromatic groups can carry in general 1, 2 or 3 substituents in the case of substitution. The substituents are preferably chosen from $C_{1-6}$-alkyl, $C_{1-6}$-alkoxy, hydroxyl, carboxyl, halogen and cyano.

5- to 7-membered nitrogen containing heterocycloalkyl or heteroaryl radicals which optionally contain further heteroatoms represent, for example pyrrolyl, pyrazolyl, imidazolyl, triazolyl, pyrrolidinyl, pyrazolinyl, pyrazolidinyl, imidazolinyl, imidazolidinyl, pyridinyl, pyridazinyl, pyrimidinyl, pyrazinyl, triazinyl, piperidinyl, piperazinyl, oxazolyl, isooxazolyl, thiazolyl, isothiazolyl, indolyl, quinolinyl, isoquinolinyl or quinaldinyl.

Halogen denotes fluorine, chlorine, bromine or iodine. In the context of this invention, carboxylate and sulfonate preferably represent a derivative of a carboxylic acid function or of a sulfonic acid function, in particular a metal carboxylate or sulfonate, a carboxylic acid ester or sulfonic acid ester function or a carboxylic acid or sulfonic acid amide function. These include e.g. the esters with $C_{1-4}$-alkanols, such as methanol, ethanol, n-propanol, isopropanol, n-butanol, sec-butanol and tert-butanol.

The cations and anions described herein may be made using conventional chemical synthesis techniques known to those having ordinary skill in the art. In addition, the cations containing tertiary amine functionality may be prepared by quaternizing the nitrogen and converting the quaternized intermediate into an ionic liquid containing the cation using the techniques disclosed, for example, in co-pending U.S. patent application Ser. No. 13/526,058, entitled: "Improved Sulfate Path for Sulfate Salt Synthesis With Dialkylsulfate Quaternization,", filed on Jun. 18, 2012; and co-pending U.S. patent application Ser. No. 13/526,432, entitled: "Ionic Liquid Synthesis With Dialkylcarbonate Quaternization," filed on Jun. 18, 2012, the disclosures of which are incorporated by reference herein in their entirety. Using the guidelines provided herein, those skilled in the art will be capable of preparing an ionic liquid comprising any of the cations described herein, together with the anions described herein.

The present inventors have discovered that the hydroxamate and N-alkyl suflamate anions described herein are particularly useful in preparing ionic liquids with cations that typically are not liquid at room temperature. For example, acetohydroxamate paired with 1-methyl-1,4-diazabicyclo[2.2.2]octanium is liquid at room temperature, but 1-methyl-1,4-diazabicyclo[2.2.2]octanium forms a solid at room temperature when paired with conventional ionic liquid anions, such as bis(trifluoromethanesulfonyl)imide, trifluoromethansulfonate, and methanesulfonate. The present inventors also discovered that benzohydroxamate forms suitable ionic liquids at room temperature with various cations, which would not ordinarily be expected since it possesses qualities that should induce ion pairs to solidify: hydrogen bonding centers and/or relatively high molecular weight. While not intending on being bound by any theory of operation, the inventors believe that the respective ions described herein provide suitable ionic liquids when not expected to be liquid, and/or provide superior ionic liquids because the ion center is coupled to groups that traditionally have excellent solvent capabilities. Accordingly, even though these groups having additional molecular weight and/or additional hydrogen bonding sites would be expected to raise the melting point of the ion, this expectation may be overcome (or overridden) by the fact that the groups are good solvents (e.g., amides, amines, alcohols, etc.).

Ionic liquids generally refer to salts that form stable liquids comprising ions. That is, ionic liquids are fully dissociated, consisting essentially of negative and positive ions. Thus, ionic liquids inherently conduct electricity. Further, ionic liquids have negligible vapor pressure, low viscosity, wide liquidus range (up to 400° C.), high thermal stability, and a large electrochemical window (>5V). Because of these properties, ionic liquids typically will not evaporate or be consumed during the charge/discharge cycle of an electrochemical cell. Embodiments of the invention include ionic liquids which have a vapor pressure at or below 1 mm Hg at 20° C. above its melting point, and preferably at or below 0.1 mmHg or zero or essentially immeasurable at 20° C. above its melting point. Room temperature ionic liquids ("RTIL") are salts which form a stable liquid at 100° C. or below at 1 atm. pressure (i.e., they have a melting point at 100° C. or below at 1 atm.). For the purposes of this application, a low temperature ionic liquid is defined as an ionic liquid having a melting point at or below 150° C. at 1 atm. Low temperature ionic liquids may also include the RTIL species.

However, even though low temperature or room temperature ionic liquids are defined by their respective melting points at 1 atm., in some embodiments the cell may be operated in an environment with a different pressure, and thus the melting point may vary with the operating pressure. Thus reference to a melting point at 1 atm. is used as a reference point to define these liquids, and does not imply or restrict its actual use conditions in operation.

The ionic liquids preferably have properties that render them suitable for use in an electrochemical cell. For example, the ionic liquids preferably have a melting point below 100° C., preferably between about 15° C. and about 75° C., a dynamic viscosity ≤2.3 GPascals, preferably a viscosity less than about 1.5 GPascals, and even more preferably less than about 1.0 GPascals, and a specific conductivity (A) of ≥100 μS/cm, preferably from about 100 μS/cm to about 250 mS/cm, even more preferably from about 1 mS/cm to about 100 mS/cm, when measured at 298 K.

Many ionic liquids are highly hydrophobic. For these ILs, the water content of the ionically conductive medium (i.e., the electrolyte) is less than 0.1% and may be essentially zero. In embodiments of the present invention, however, the electrolyte may include appreciable amounts of water. For example, the water content may be between 0.001% and 75%. In an embodiment, the water content may be between 0.1% and 50%. In another embodiment, the water content may be between 1% and 30%. The IL systems may be protic or aprotic.

In a zinc-air battery using ionic liquid electrolytes, the water content is typically controlled to minimize hydrogen evolution, control plating morphology, and maintain a constant water activity within the cell. On discharge, Zn metal is oxidized at the fuel electrode and solvated or complexed into solution, releasing electrons into the circuit. Simultaneously, molecular oxygen is reduced at the air electrode consuming those electrons released at the anode. Upon reaching the solubility of zinc ions, ZnO is precipitated within the cell. On charge, $Zn^{2+}$ ions are reduced at the negative (fuel) electrode. Simultaneously at the air electrode, an oxidation reaction that results in the evolution of molecular oxygen occurs.

In aqueous metal-air batteries the oxidation reaction at the air electrode during charge is simply the oxidation of water. This reaction, in addition to releasing $O_2$ gas, results in $H^+$ ions migrating through the cell. However, because zinc has a large overpotential for the hydrogen reduction reaction in aqueous electrolytes, faradaic efficiencies on the of order 95% are seen. The faradaic or current efficiency is the efficiency with which charge (electrons) are transferred in an electrochemical system. Electron losses are generally caused by electrons which participate in unproductive reactions and short circuits. Hydrogen reduction is an example of such an unproductive reaction. Thus, the large overpotential for hydrogen reduction (i.e., the barrier which must be overcome for hydrogen reduction) on zinc means that hydrogen reduction is unfavorable, resulting in a high faradaic efficiency.

Certain ionic liquids useful in the preferred embodiments allow anywhere from 0.1-50% (or even higher) water into a zinc-air ionic liquid battery, the oxidation reactions at the air electrode during charge are supported—that is, water is made available at the oxygen electrode for oxidation. Additionally, small quantities of water within ionic liquids destabilize the well known superoxide species ($HO_2$) that is generated in aprotic media, high pKa conjugate acids, and basic media via disproportionation reactions.

An additional benefit to adding water to the ionic liquid is that the $H^+$ ions released from the water oxidation reaction transiently mildly acidify the electrolyte thereby promoting the solvation of the ZnO precipitate. More specifically, the $H^+$ ion may increase acidity local to the ZnO precipitate, but may not acidify the solution on a bulk scale. The solvation of ZnO can be described in the following reaction:

$$ZnO+2H^+ \rightarrow Zn^{2+}+H_2O \quad (3)$$

Further, small quantities of water in ionic liquids may substantially decrease viscosity, resulting in an increase in conductivity.

In addition, the faradaic efficiency in aqueous electrolytes is high (~95%). This is true even without the specific adsorption of ionic liquid ions (or additives within the cell). Because of the high faradaic efficiency in aqueous electrolytes, an ionic liquid electrolyte with a 5% water content is expected to have a faradaic loss on the order of 0.25% (5% water content*5% loss=0.25%).

In a metal-air battery, the metal is the fuel. That is, during discharge the metal is oxidized at the anode, providing electrons which can be used for electrical work. The oxidation reaction may be represented by the following equation:

$$Metal \rightarrow Metal^{n+}+(n)e^- \quad (3)$$

The metal fuel may be of any type, and may be electrodeposited, absorbed, physically deposited, or otherwise provided on or constituting the fuel electrode. The fuel may be of any metal, including alloys or hydrides thereof, for example. For example, the fuel may comprise transition metals, alkali metals, alkali earth metals, and other or "poor" metals. Transition metals include, but are not limited to zinc, iron, manganese, and vanadium. The most common alkali metal is lithium but other alkali metals may be used. The other metals include, but are not limited to, magnesium, aluminum and gallium. As used herein, the term metal fuel refers broadly to any fuel comprising a metal, including elemental metal, metal bonded in a molecule or complex, including oxides, metal alloys, metal hydrides, etc. The fuel electrode may be formed of the metal fuel as the electrode body itself in some embodiments.

The fuel electrode may have any construction or configuration. For example, the fuel electrode may be a porous structure with a three-dimensional network of pores, a mesh screen, a plurality of mesh screens isolated from one another, or any other suitable electrode. The fuel electrode includes a current collector, which may be a separate element, or the body on which the fuel is received may be electroconductive and thus also be the current collector. In an embodiment, the fuel electrode is laminated, bonded, or attached to a backing that provides the external surface of the fuel electrode. This backing may be liquid impermeable or essentially impermeable to the ionic liquid to prevent the ionic liquid from permeating outwardly through the fuel electrode via its external surface. More preferably, the backing is also impermeable to air, and particularly oxygen or other oxidant, to prevent any undesirable parasitic reaction, such as oxidant reduction in the presence of the fuel oxidation that occurs at the electrode during discharge.

Further details regarding metal fuels and fuel electrodes may be found in U.S. patent application Ser. Nos. 12/385,217, 12/385,489, 12/885,268, 12/901,410, 12/631,484, 12/549, 617, 13/019,923, 13/028,496, 61/193,540, 61/301,377, 61/323,384, 61/329,278, 61/365,645, 61/394,954, 61/358, 339, 61/383,510 and 61/243,970, the disclosures of each of which is incorporated by reference herein in their entirety.

During discharge, oxygen at the air electrode is reduced, consuming electrons. There are several possible mechanisms for oxygen reduction. The oxygen reduction reaction may occur, for example, via one of the three mechanisms discussed below. Other mechanisms, however, may occur depending on the chemical system (ionic liquid, electrode materials) chosen.

A first possible and non-limiting mechanism is a four-electron oxygen reduction reaction (ORR) where the product is a fully reduced oxygen dianion. The four-electron oxygen reduction reaction may be represented by the following equation:

$$O_2 + 2H_2O + 4e^- \rightarrow 4OH^- \tag{4}$$

Depending on the specific chemistry of the system, this reaction may form a soluble product or result locally in the formation of an insoluble metal-oxide.

In this reaction, the anions liberated may serve to mediate continued anode reaction. Relative to the other oxygen reduction mechanisms, the four-electron oxygen reduction reaction has the advantages of increased energy density and extracting the maximum number of electrons per oxygen molecule.

A second possible and non-limiting mechanism is a two-electron peroxide route. An examples of this mechanism may be represented by the following equation:

$$Zn^{2+} + O_2 + 2e^- \rightarrow ZnO_2 \tag{6}$$

This mechanism has the advantage of relatively low overpotentials for the peroxide reaction. It also tends to have enhanced rechargeability relative to the first mechanism. The two-electron peroxide mechanism, however, results in lower energy density at the oxygen electrode battery relative to a four-electron process.

A third possible and non-limiting mechanism is a mixed two-electron/four-electron ORR that capitalizes on the reducing power of certain aliovalent cations. An examples of this mechanism may be represented by the following equation:

$$Mn^{2+} + O_2 + 2e^- \rightarrow MnO_2 \tag{7}$$

The nuance in this mechanism is that the product involves fully reduced $O^{2-}$ species generated by the reducing power of the aliovlent metal. In this example, $Mn^{2+}$ ends up in the $Mn^{4+}$ state on the right. This mechanism has the advantage of lower overpotentials due to reducing power of the aliovalent cation. Further, aliovalent metals may be used to make more efficient cells. The mixed two-electron/four-electron mechanism, however, results in a lower energy density battery relative to a four-electron process.

Air electrodes are typically porous structures made of polytetrafluoroethylene (PTFE) materials such as Teflon®. Preferably, the air electrode material has a high degree of solvophobicity with the electrolyte. Solvophobicity within the air electrode serves the dual roles of "wet-proofing" (i.e. preventing liquid electrolyte from leaving the cell) and improving access of the oxygen in the air to the oxygen reduction reaction catalyst within the porous structure. Access to the catalyst is enhanced by solvophobicity due to an increase in the triple-junction line length of air-catalyst-electrolyte. The increase in the triple-junction line length reduces transport limitations. While a strong solvophobic character is advantageous, however, including solvophilic constituents in the electrode improves the tortuosity of the triple junction, improving superficial reaction site density.

FIG. 1 illustrates a low temperature ionic liquid (IL) electrochemical cell ("electrochemical cell"), generally indicated at 10, according to the embodiments of the present invention. As illustrated and described below, the electrochemical cell 10 includes a plurality of electrodes including a first electrode 12 and a second electrode 14. In other embodiments, the first electrode or the second electrode of the electrochemical cell 10 may be provided by configurations other than a single electrode. In the non-limiting embodiment illustrated in FIG. 1, the first electrode 12 is a cathode, and more specifically an air cathode, and will be referred to hereinafter as an air electrode 12. The second electrode 14 is an anode, and will be referred to hereinafter as a metal electrode 14. In an embodiment, and as described below, the electrochemical cell 10 may generate electricity by virtue of an oxidation half-reaction of a fuel at the metal electrode 14 in parallel, that is, substantially at the same time, with a reduction half-reaction of an oxidizer 20 at the air electrode 12. The illustrated embodiment is not intended to be limiting in any way.

The air electrode 12 and the metal electrode 14 preferably are spaced apart to form a gap 16 therebetween. A room temperature ionic liquid (RTIL), generally indicated at 18, may flow along the gap 16 so that the RTIL 18 may contact both the air electrode 12 and the metal electrode 14 at the same time. In an embodiment, it should be understood that the electrochemical cell 10 may be oriented in any way, and the RTIL may flow in directions other than what is illustrated. Thus, any directional references are made with regard to the orientation as shown in FIG. 1, and are not intended to limit a working embodiment to any particular orientation. In other embodiments, the RTIL 18 may be static with no flow at all. The RTIL 18 may make contact with the air electrode 12 at an air electrode/RTIL interface 24. The RTIL 18 may make contact with the metal electrode 14 at a metal electrode/RTIL interface 26. In alternative embodiments, the RTIL does not flow. That is, no mechanism for forced flow is included in the cell.

It is preferred in certain embodiments that the RTIL contain water to facilitate the electrochemical reactions (discharging and charging over a number of cycles) taking place within the electrochemical cell 10. Preferably, the ionic liquid includes water in amounts of from about 15% to about 50%, more preferably from about 20% to about 40%, and most preferably from about 25% to about 30%. In electrochemical cells 10 that do not comprise a cathode and/or anode that requires water to facilitate the electrochemical reactions, it is preferred that the ionic liquids comprise less than about 25% water, more preferably less than about 20%, even more preferably less than about 15% water. Those skilled in the art will be capable of determining the appropriate amount of water to include in the RTIL prepared in accordance with the embodiments, using the guidelines provided herein.

As alluded to above, a reduction half-reaction may take place at the air electrode 12. In an embodiment, an oxidizer 20 may be reduced through the reduction half-reaction at the air electrode 12. For non-limiting illustration purposes, the electrons from the metal electrode 14 may flow to an external circuit 22 (i.e., a load) and return to the air electrode 12 to facilitate the reduction of the oxidizer 20. The oxidizer 20 is reduced on the air electrode 12 at oxidizer reduction reaction sites 21. In an embodiment, a catalyst is used to facilitate the oxidizer reduction half-reaction at the oxidizer reduction reaction sites 21. The air electrode 12 may include catalyst material, such as manganese oxide, nickel, pyrolyzed cobalt, activated carbon, silver, platinum, or any other catalyst material or mixture of materials with high oxygen reduction activity for catalyzing reduction of the oxidizer, which will be discussed below. In an embodiment, the air electrode 12 may be porous and the porous body with a high surface area may comprise the catalyst material.

In an embodiment, the air electrode 12 may be a passive or "breathing" air electrode 12 that is passively exposed, such as through windows or openings to an oxidizer source (typically oxygen present in ambient air) and absorbs the oxidizer 20 for consumption in the electrochemical cell 10 reactions. That is, the oxidizer 20, will permeate from the oxidizer source into the air electrode 12. Thus, the oxidizer 20 need not be actively pumped or otherwise directed to the air electrode 12, such as via an inlet. Any part of the air electrode 12 by which the oxidizer 20 is absorbed or otherwise permeates or contacts the air electrode 12 may be generically referred to as an "input." The term input may broadly encompass all ways of delivering oxidizer to the air electrode 12 for the oxidizer reduction half-reaction at the oxidizer reduction reaction sites 21 on the air electrode 12.

By means of a non-limiting illustration, the air electrode 12 may be a gas permeable electrode having an outer surface exposed to ambient air such that the oxidizer 20 comprises oxygen that permeates the air electrode 12. Similarly, the air electrode 12 may comprise a barrier membrane on the outer surface of the air electrode 12 that is gas permeable and liquid impermeable so as to permit permeation of the oxidizer 20 via the outer surface of the air electrode 12 and prevent the RTIL 18 from flowing through the outer surface of the air electrode 12. In an embodiment, the air electrode 12 may be a porous body covered on the inner side by a liquid permeable layer through which the RTIL 18 may pass through so that the low temperature IL 18 may contact the porous body.

The relationship between the RTIL 18 and the air electrode 12 may impact the overall energy density of the electrochemical cell 10. For that reason, the vapor pressure and surface tension characteristics of the RTIL 18 in view of the air electrode 12 should be carefully selected. For instance, in an embodiment, the air electrode 12 may repel the RTIL so that it may prevent the RTIL 18 from wicking, that is, flowing in a capillary-like manner through the air electrode 12. In another embodiment, the air electrode 12 may be designed with porosity to absorb the RTIL so that it exposes the RTIL to more air electrode 12 surface area for purposes of enabling the desired electrochemical reactions at the air electrode 12. The air electrode 12 may support catalyst decoration at the oxidizer reduction reaction sites 21 to improve the efficiency of the reaction. In an embodiment, the catalyst may be decorated with metal ions which may enhance the activity of the catalyst in catalyzing the oxidizer reduction reaction at the oxidizer reduction reaction sites 21 on the air electrode 12. The air electrode 12 may have a high ionic conductivity to provide reactants and remove products of the oxidizer reduction reaction from the air electrode 12. In an embodiment, the air electrode 12 may have high electrical conductivity character to carry electrons from the external load 22 to the oxidizer reduction reaction sites 21. The air electrode 12 and RTIL 18 characteristics may be further defined.

In an embodiment, the metal-oxide by-products 28 may be formed at the metal electrode 14. Whereas reduced oxidizer ions in an aqueous electrolyte coordinate, that is, donate electrons to water molecules to form water, peroxides and/or hydroxides, and thereby increase problems with vapor pressure and corrosion, in this non-limiting embodiment, the RTIL 18 may promote both the oxidizer reduction reaction at the air electrode 12 and the conduction of the reduced oxidizer ions to the metal electrode 14. In support of this result, the RTIL 18 may contain soluble species that interact with the reduced oxidizer ions, with the RTIL 18 typically being protic. The RTIL 18 may also support the reduced oxidizer ions as they migrate to the metal electrode 14. By means of a non-limiting illustration, the migration of the reduced oxidizer ions may refer to transport of the reduced oxidizer ions via convection transport, or conduction transport or diffusion transport. The RTIL 18 may also support the oxidized metal-fuel ions remaining at the metal electrode 14. In doing so, the RTIL 18 promotes the reaction between the reduced oxidizer ions and the oxidized metal-fuel ions to produce the metal-oxide by-products 28. In an embodiment, the metal-oxide by-products 28 may be stored at the metal electrode 14. In an embodiment where the metal-oxide by-product 28 is stored at the metal electrode 14, this embodiment is best used as a primary (i.e., non-rechargeable) battery, as the oxygen is stored at the metal electrode 14 and is not locally available to an oxygen evolving electrode for oxidation of the reduced oxygen species.

The storage of the metal oxide locally at the air electrode is facilitated by the air electrode 12 having a pore size in at least the regions contacting the ionic liquid sufficient to contain the oxide within the air electrode 12 body. That is, the pore size may be dependent on the size of the oxide. A network of such pores may increase the storage capacity of the air electrode 12.

In an embodiment, the oxidizer source is ambient air, and the oxidizer 20 is oxygen. In an embodiment, oxygen as the oxidizer 20 may be reduced at the air electrode 12 to form reduced oxygen ions. In an embodiment, the oxygen may be supplied from an evolved oxygen recovery system used in a regenerative electrochemical cell. Other examples of electrochemical cells that may be useful embodiments of the invention herein are shown, for example, in U.S. patent application Ser. No. 12/549,617, filed on Aug. 28, 2009, which is incorporated herein by reference in its entirety.

The electrolytes of the present invention may be used in other cell configurations. An alternate cell configuration, for example, comprises a compact wound cell illustrated in U.S. Patent Application No. 61/267,240 and Ser. No. 12/776,962, hereby incorporated by reference in their entirety.

Because of evaporation, water electrolysis during recharging, and self-discharge, aqueous electrolytes can be problematic for metal air batteries. These problems not only result in a loss of electrolyte but also a reduction in the round trip efficiency of a rechargeable battery. The use of an ionic liquid electrolyte reduces or may eliminate some of these problems. Even with an ionic liquid electrolyte, however, the presence of water may cause the release of toxic gases and/or cause self-discharge. On the other hand, an ionic liquid electrolyte according to embodiments of the invention may include small amounts of water. For example, water contents of 10-100 ppm have been found to improve oxygen reduction of aprotic systems without causing unacceptable self-discharge or release of toxic gases. Consequently, some preferred embodiments include ionic liquids prepared as described herein, in which the ionic liquids contain anywhere from about 5 to about 100,000 ppm water, more preferably from about 7 to about 1,000 ppm water, and most preferably from about 10 to about 100 ppm water.

All publications, patents, and patent applications cited herein are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

In an embodiment, the proton on the nitrogen atom of the hydroxamate may be further methylated which may improve electrochemical stability. An suitable method known in the art may be used.

The forgoing embodiments have been provided solely to illustrate example of the present invention and should not be considered limiting. To the contrary, the present invention encompasses all modifications, substitutions, alterations, and equivalents with in the spirit and scope of the embodiments described herein.

The following examples are provided for illustrative purposes only. Ionic liquids were prepared using various cations and various sulfonate containing anions. These ionic liquids were tested for stability and usefulness in an electrochemical cell.

Example 1

According to an embodiment of the invention, diazabicyclo[2.2.2]octonium benzohydroxamate was prepared through a neutralization reaction between benzohydroxamic acid (TCI, Portland, Oreg.) and diazabicyclo[2.2.2]octonium hydroxide according to the following reaction:

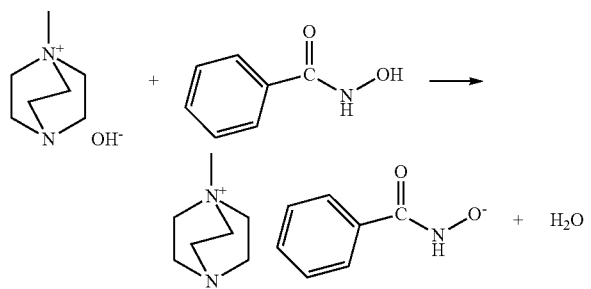

Diazabicyclo[2.2.2]octonium hydroxide was prepared as described in U.S. patent application Ser. No. 13/526,432. An amount of 0.3398 g benzohydroxamic acid was added to 3 ml of 11.7 wt % diazabicyclo[2.2.2]octonium hydroxide solution in water ($\rho$=1.017 g/ml, pH >12) resulting in approximately 0.3583 g of diazabicyclo[2.2.2]octonium hydroxide. The reaction vial was placed in a rotary evaporator at 70° C. and the pressure was decreased from 350 mbar to 100 mbar in 50 mbar segments every 5 minutes until solids became observable. Subsequently, the temperature was increased to 80° C. and remaining water was evaporated after a total of 40 min. The pH of the solution dropped to below 10. The product was placed in a 5% RH box for 12 hours and the final product mass was found to be approximately 0.6536 g.

Example 2

According to an embodiment of the invention, diazabicyclo[2.2.2]octonium 2,5-Dioxo-1-pyrrolidinolate was prepared through a neutralization reaction between N-hydroxysuccinimide (TCI, Portland, Oreg.) and diazabicyclo[2.2.2]octonium hydroxide according to the following reaction:

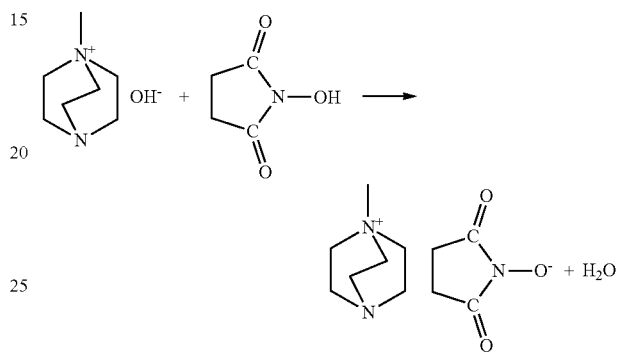

Diazabicyclo[2.2.2]octonium hydroxide was prepared as described in U.S. patent application Ser. No. 13/526,432. An amount of 0.2904 g N-hydroxysuccinimide was added to 3 ml of 11.7 wt % diazabicyclo[2.2.2]octonium hydroxide solution in water ($\rho$=1.017 g/ml, pH=9) resulting in approximately 0.3570 g of diazabicyclo[2.2.2]octonium hydroxide. The reaction vial was placed in a rotary evaporator at 75'C/100 mbar for 50 minutes. A viscous product formed and the product was placed in a 5% RH box for 12 hours with the final product mass of approximately 0.6024 g.

What is claimed is:

1. An ionic liquid comprising a cation and an anion selected from hydroxamate and N-alkyl sulfamate anions, wherein the hydroxamate anion has the following general formula:

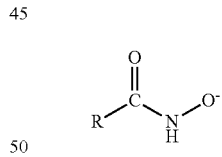

wherein R is selected from hydrogen, linear or branched, saturated or unsaturated, aliphatic or alicyclic alkyl groups having 1 to 30 carbon atoms; oligoethylene glycol monoalkyl ethers of the form (R'—(O—CH$_2$—CH$_2$)$_p$—O—CH$_2$—CH$_2$), wherein p represents a number of from 1 to 30 and R' represents a linear or branched, saturated or unsaturated, aliphatic or alicyclic alkyl group having 1 to 30 carbon atoms; alkenyl; cycloalkyl; heteroaryl-C$_{1-6}$-alkyl groups having from 3 to 8 carbon atoms in the aryl residue and at least one heteroatom selected from N, O, P, and S which may be substituted with at least one C$_{1-6}$ alkyl group and/or halogen atoms; and aryl-C$_{1-6}$-alkyl groups having from 5 to 12 carbon atoms in the aryl residue which may be optionally substituted with at least one C$_{1-6}$ alkyl group and/or halogen atom; and the N-alkyl sulfamate anion has the following general formula:

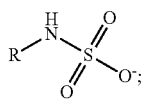

wherein R is selected from linear or branched, saturated or unsaturated, aliphatic or alicyclic alkyl groups having 1 to 30 carbon atoms; oligoethylene glycol monoalkyl ethers of the form (R'—(O—CH$_2$—CH$_2$)$_p$—O—CH$_2$—CH$_2$), wherein p represents a number of from 1 to 30 and R' represents a linear or branched, saturated or unsaturated, aliphatic or alicyclic alkyl group having 1 to 30 carbon atoms; alkenyl; heteroaryl-C$_{1-6}$-alkyl groups having from 3 to 8 carbon atoms in the aryl residue and at least one heteroatom selected from N, O, P, and S which may be substituted with at least one C$_{1-6}$ alkyl group and/or halogen atoms; aryl-C$_{1-6}$-alkyl groups having from 5 to 12 carbon atoms in the aryl residue which may be optionally substituted with at least one C$_{1-6}$ alkyl group and/or halogen atom.

2. The ionic liquid as claimed in claim 1, wherein the cation is selected from one or more cations selected from the group consisting of:

Phosphonium cations of the general formula:

(PR$^1$R$^2$R$^3$R)$^+$;

Quaternary ammonium cations of the general formula:

(NR$^1$R$^2$R$^3$R)$^+$;

Imidazolium cations of the general formula:

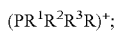

Pyrazolium cations of the general formula:

Thiazolium cations of the general formula:

Pyridinium cations of the general formula:

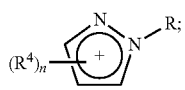

Triazolium cations of the general formula:

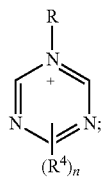

Quinolinium cations of the general formula:

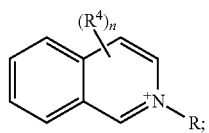

Morpholinium cations of the general formula:

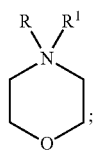

and

Diazabicyclo[2,2,2]octonium cations of the general formula:

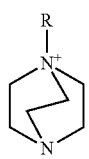

wherein R$^1$, R$^2$, and R$^3$, are independently selected at each occurrence from the group consisting of hydrogen; linear or branched, saturated or unsaturated, aliphatic or alicyclic alkyl groups having from 1 to 30 carbon atoms; oligoethylene glycol monoalkyl ethers of the form (R'—(O—CH$_2$—CH$_2$)$_p$—O—CH$_2$—CH$_2$), wherein p represents a number of from 1 to 30 and R' represents a linear or branched, saturated or unsaturated, aliphatic or alicyclic alkyl group having 1 to 30 carbon atoms; alkenyl; cycloalkyl; heteroaryl, heteroaryl-C$_{1-6}$-alkyl groups having from 3 to 8 carbon atoms in the heteroaryl residue and at least one heteroatom selected from N, O, P, and S which may be substituted with at least one group selected from alkyl groups and/or halogen atoms; and aryl-C$_{1-6}$-alkyl groups having from 5 to 12 carbon atoms in the aryl residue which may be optionally substituted with at least one C$_{1-6}$ alkyl group and/or halogen atom;

where R is selected from the group consisting of linear or branched, saturated or unsaturated, aliphatic or alicyclic alkyl groups having 1 to 30 carbon atoms; oligoethylene glycol monoalkyl ethers of the form (R'—(O—CH$_2$—CH$_2$)$_p$—O—CH$_2$—CH$_2$), wherein p represents a number of from 1 to 30 and R' represents a linear or branched, saturated or unsaturated, aliphatic or alicyclic alkyl group having 1 to 30 carbon atoms; alkenyl; cycloalkyl; heteroaryl-$C_{1-6}$-alkyl groups having from 3 to 8 carbon atoms in the aryl residue and at least one heteroatom selected from N, O, P, and S which may be substituted with at least one $C_{1-6}$ alkyl group and/or halogen atoms; and aryl-$C_{1-6}$-alkyl groups having from 5 to 12 carbon atoms in the aryl residue which may be optionally substituted with at least one $C_{1-6}$ alkyl group and/or halogen atom;

where n is 0, 1, 2, 3, or 4; and where $R^4$ is selected from $C_{1-6}$-alkyl, halogen, amino, cyan, $C_{1-4}$-alkoxy, carboxylate, or sulfonate.

3. The ionic liquid as claimed in claim 1, wherein the anion is a hydroxamate selected from the group consisting of acetohydroxyamate, benzohydroxamate, and mixtures thereof.

4. The ionic liquid as claimed in claim 1, wherein the anion is N-(2-pyridylmethyl) sulfamate.

5. The ionic liquid as claimed in claim 1, wherein the ionic liquid comprises one or more cation-anion pairs selected from the group consisting of N-ethyl-N-methylmorpholinium N-(2-pyridylmethyl) sulfmate; 1-methyl-1,4-diazabicyclo[2,2,2]octanium acetohydroxamate; 1-methyl-1,4-diazabicyclo[2,2,2]octanium benzohydroxamate, and mixtures thereof.

6. The ionic liquid as claimed in claim 1, wherein the ionic liquid has a melting point below 100° C.

7. The ionic liquid as claimed in claim 1, wherein the ionic liquid has a dynamic viscosity ≤2.3 GPascals.

8. The ionic liquid as claimed in claim 1, wherein the ionic liquid has a specific conductivity ($\Lambda$) of ≥100 µS/cm, when measured at 298K.

9. An electrochemical cell comprising:
a) a fuel electrode for oxidizing a fuel;
b) an air electrode configured to absorb and reduce gaseous oxygen; and
c) an ionic liquid comprising a cation and an anion selected from hydroxamate and N-alkyl sulfamate anions.

10. The electrochemical cell as claimed in claim 9, wherein the hydroxamate anion has the following general formula:

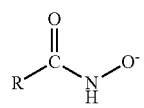

wherein R is selected from hydrogen, linear or branched, saturated or unsaturated, aliphatic or alicyclic alkyl groups having 1 to 30 carbon atoms; oligoethylene glycol monoalkyl ethers of the form (R'—(O—CH$_2$—CH$_2$)$_p$—O—CH$_2$—CH$_2$), wherein p represents a number of from 1 to 30 and R' represents a linear or branched, saturated or unsaturated, aliphatic or alicyclic alkyl group having 1 to 30 carbon atoms; alkenyl; cycloalkyl; heteroaryl-$C_{1-6}$-alkyl groups having from 3 to 8 carbon atoms in the aryl residue and at least one heteroatom selected from N, O, P, and S which may be substituted with at least one $C_{1-6}$ alkyl group and/or halogen atoms; and aryl-$C_{1-6}$-alkyl groups having from 5 to 12 carbon atoms in the aryl residue which may be optionally substituted with at least one $C_{1-6}$ alkyl group and/or halogen atom; and the N-alkyl sulfamate anion has the following general formula:

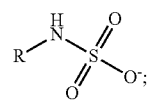

wherein R is selected from linear or branched, saturated or unsaturated, aliphatic or alicyclic alkyl groups having 1 to 30 carbon atoms; oligoethylene glycol monoalkyl ethers of the form (R'—(O—CH$_2$—CH$_2$)$_p$—O—CH$_2$—CH$_2$), wherein p represents a number of from 1 to 30 and R' represents a linear or branched, saturated or unsaturated, aliphatic or alicyclic alkyl group having 1 to 30 carbon atoms; alkenyl; heteroaryl-$C_{1-6}$-alkyl groups having from 3 to 8 carbon atoms in the aryl residue and at least one heteroatom selected from N, O, P, and S which may be substituted with at least one $C_{1-6}$ alkyl group and/or halogen atoms; aryl-$C_{1-6}$-alkyl groups having from 5 to 12 carbon atoms in the aryl residue which may be optionally substituted with at least one $C_{1-6}$ alkyl group and/or halogen atom.

11. The electrochemical cell as claimed in claim 9, wherein the cation is selected from one or more cations selected from the group consisting of:

Phosphonium cations of the general formula:

$(PR^1R^2R^3R)^+$;

Quaternary ammonium cations of the general formula:

$(NR^1R^2R^3R)^+$;

Imidazolium cations of the general formula:

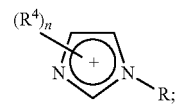

Pyrazolium cations of the general formula:

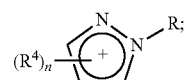

Thiazolium cations of the general formula:

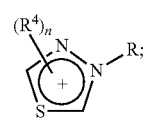

Pyridinium cations of the general formula:

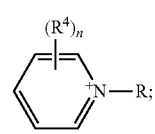

Triazolium cations of the general formula:

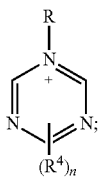

Quinolinium cations of the general formula:

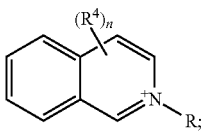

Morpholinium cations of the general formula:

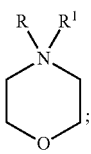

and
Diazabicyclo[2,2,2]octonium cations of the general formula:

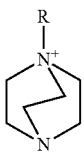

wherein $R^1$, $R^2$, and $R^3$, are independently selected at each occurrence from the group consisting of hydrogen; linear or branched, saturated or unsaturated, aliphatic or alicyclic alkyl groups having from 1 to 30 carbon atoms; oligoethylene glycol monoalkyl ethers of the form (R'—(O—CH$_2$—CH$_2$)$_p$—O—CH$_2$—CH$_2$), wherein p represents a number of from 1 to 30 and R' represents a linear or branched, saturated or unsaturated, aliphatic or alicyclic alkyl group having 1 to 30 carbon atoms; alkenyl; cycloalkyl; heteroaryl, heteroaryl-C$_{1-6}$-alkyl groups having from 3 to 8 carbon atoms in the heteroaryl residue and at least one heteroatom selected from N, O, P, and S which may be substituted with at least one group selected from alkyl groups and/or halogen atoms; and aryl-C$_{1-6}$-alkyl groups having from 5 to 12 carbon atoms in the aryl residue which may be optionally substituted with at least one C$_{1-6}$ alkyl group and/or halogen atom;

where R is selected from the group consisting of linear or branched, saturated or unsaturated, aliphatic or alicyclic alkyl groups having 1 to 30 carbon atoms; oligoethylene glycol monoalkyl ethers of the form (R'—(O—CH$_2$—CH$_2$)$_p$—O—CH$_2$—CH$_2$), wherein p represents a number of from 1 to 30 and R' represents a linear or branched, saturated or unsaturated, aliphatic or alicyclic alkyl group having 1 to 30 carbon atoms; alkenyl; cycloalkyl; heteroaryl-C$_{1-6}$-alkyl groups having from 3 to 8 carbon atoms in the aryl residue and at least one heteroatom selected from N, O, P, and S which may be substituted with at least one C$_{1-6}$ alkyl group and/or halogen atoms; and aryl-C$_{1-6}$-alkyl groups having from 5 to 12 carbon atoms in the aryl residue which may be optionally substituted with at least one C$_{1-6}$ alkyl group and/or halogen atom;

where n is 0, 1, 2, 3, or 4; and where $R^4$ is selected from C$_{1-6}$-alkyl, halogen, amino, cyan, C$_{1-4}$-alkoxy, carboxylate, or sulfonate.

12. The electrochemical cell as claimed in claim 9, wherein the anion is a hydroxamate selected from the group consisting of acetohydroxyamate, benzohydroxamate, and mixtures thereof.

13. The electrochemical cell as claimed in claim 9, wherein the anion is N-(2-pyridylmethyl) sulfamate.

14. The electrochemical cell as claimed in claim 9, wherein the ionic liquid comprises one or more cation-anion pairs selected from the group consisting of N-ethyl-N-methylmorpholinium N-(2-pyridylmethyl) sulfmate; 1-methyl-1,4-diazabicyclo[2,2,2]octanium acetohydroxamate; 1-methyl-1,4-diazabicyclo[2,2,2]octanium benzohydroxamate, and mixtures thereof.

* * * * *